(12) United States Patent
Giura et al.

(10) Patent No.: US 11,095,586 B2
(45) Date of Patent: Aug. 17, 2021

(54) DETECTION OF SPAM MESSAGES

(71) Applicant: AT&T Intellectual Property I, L.P., Atlanta, GA (US)

(72) Inventors: Paul Giura, Cairo, NY (US); Baris Coskun, West New York, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/414,840

(22) Filed: May 17, 2019

(65) Prior Publication Data
US 2019/0281000 A1    Sep. 12, 2019

Related U.S. Application Data

(63) Continuation of application No. 14/264,159, filed on Apr. 29, 2014, now Pat. No. 10,333,877.

(51) Int. Cl.
*G06F 15/16* (2006.01)
*H04L 12/58* (2006.01)

(52) U.S. Cl.
CPC .................. *H04L 51/12* (2013.01)

(58) Field of Classification Search
CPC .......... H04L 51/12; H04L 51/32; G06Q 50/01
See application file for complete search history.

(56) References Cited

U.S. PATENT DOCUMENTS

| | | | |
|---|---|---|---|
| 7,444,515 B2 | 10/2008 | Dharmapurikar | |
| 7,716,297 B1 | 5/2010 | Wittel | |
| 7,873,996 B1 * | 1/2011 | Emigh | H04L 51/12 726/22 |
| 7,921,159 B1 * | 4/2011 | Cooley | H04L 51/12 382/165 |
| 7,936,682 B2 | 5/2011 | Singh | |

(Continued)

FOREIGN PATENT DOCUMENTS

| | | |
|---|---|---|
| EP | 1965329 | 9/2008 |
| WO | WO 2008/091984 | 7/2008 |

(Continued)

OTHER PUBLICATIONS

Lahmadi et al., "Hinky: Defending Against Text-based Message Spam on Smartphones", IEEE International Conference on Communications (ICC), May 21, 2011, 5 pages.

(Continued)

*Primary Examiner* — Brian Whipple
*Assistant Examiner* — Tesfu N Mekonen
(74) *Attorney, Agent, or Firm* — Guntin & Gust, PLC; John G. Rauch

(57) ABSTRACT

A method of generating a signature for a group of electronic messages that each include a plurality of characters comprises extracting a plurality of blocks of characters from each of the electronic messages, mathematically processing each of the blocks of characters from each electronic message, and generating a signature for the group of electronic messages based at least in part on the mathematically processed blocks of characters. In some embodiments a counting Bloom filter may be used to generate the signature. The signatures generated by these methods may be used to identify spam.

20 Claims, 10 Drawing Sheets

Your entry in our drawing WON you a free $500. Code NYP.

Your entry in our drawing WON you $1000. Code AYP.

Your entry in our contest WON you a free $1500. Code NYZ.

Your entry in our drawing WON you $250. Code ZXP.

Your entry in our drawing WON you a free $300. Code ASD.

Your entry in our contest WON you $600. Code DFY.

Your entry in our drawing WON you a free $700. Code FGH.

Your entry in our drawing WON you $800. Code MNT.

Your entry in our contest WON you a free $900. Code PLE.

(56) References Cited

U.S. PATENT DOCUMENTS

| | | | | |
|---|---|---|---|---|
| 7,979,082 B2* | 7/2011 | Dholakia | | H04W 4/14 |
| | | | | 455/466 |
| 8,037,145 B2* | 10/2011 | Bunker | | G06F 16/3331 |
| | | | | 709/206 |
| 8,042,181 B2 | 10/2011 | Judge | | |
| 8,112,483 B1* | 2/2012 | Emigh | | G06F 21/36 |
| | | | | 709/206 |
| 8,260,910 B2 | 9/2012 | Schuba | | |
| 8,275,842 B2* | 9/2012 | Ngan | | G06F 15/16 |
| | | | | 709/206 |
| 8,356,076 B1 | 1/2013 | Wittel et al. | | |
| 8,412,779 B1 | 4/2013 | Qian | | |
| 8,443,049 B1 | 5/2013 | Geddes | | |
| 8,495,737 B2 | 7/2013 | Sinha | | |
| 8,825,769 B2* | 9/2014 | Zheleva | | G06F 21/55 |
| | | | | 709/206 |
| 2003/0172294 A1* | 9/2003 | Judge | | H04L 63/1433 |
| | | | | 726/13 |
| 2004/0073617 A1* | 4/2004 | Milliken | | G06F 21/562 |
| | | | | 709/206 |
| 2004/0260776 A1* | 12/2004 | Starbuck | | H04L 51/12 |
| | | | | 709/206 |
| 2005/0015454 A1* | 1/2005 | Goodman | | H04L 51/12 |
| | | | | 709/207 |
| 2005/0198160 A1* | 9/2005 | Shannon | | G06Q 10/107 |
| | | | | 709/206 |
| 2006/0095521 A1* | 5/2006 | Patinkin | | G06Q 10/107 |
| | | | | 709/206 |
| 2008/0059590 A1 | 3/2008 | Sarafijanovic | | |
| 2009/0031136 A1 | 1/2009 | Milliken | | |
| 2010/0332765 A1 | 12/2010 | Cypher | | |
| 2012/0030293 A1* | 2/2012 | Bobotek | | G06Q 10/10 |
| | | | | 709/206 |
| 2013/0018884 A1 | 1/2013 | Chandrasekharappa et al. | | |
| 2013/0018906 A1* | 1/2013 | Nigam | | H04L 51/12 |
| | | | | 707/758 |
| 2013/0173518 A1 | 7/2013 | Alspector | | |
| 2014/0004892 A1 | 1/2014 | Murynets | | |
| 2014/0114978 A1* | 4/2014 | Chatterjee | | G06Q 10/107 |
| | | | | 707/739 |
| 2015/0120583 A1* | 4/2015 | Zarrella | | G06Q 30/018 |
| | | | | 705/317 |
| 2015/0281153 A1* | 10/2015 | Murtagh | | H04L 51/10 |
| | | | | 709/206 |

FOREIGN PATENT DOCUMENTS

| | | |
|---|---|---|
| WO | WO 2011/139687 | 11/2011 |
| WO | WO 2013/009540 | 1/2013 |

OTHER PUBLICATIONS

Vural, et al., "Combating Mobile Spam Through Botnet Detection using Artificial Immune Systems," Journal of Universal Computer Science, vol. 18, No. 6 (2012), pp. 750-774.

Coskun, B and Giura, P., "Mitigating SMS Spam by Online Detection of Repetitive Near-Duplicate Messages," Communication (ICC), 2012 IEEE International Conference on, vol. pp. 999, 1004, Jun. 10-15, 2012, doi: 10.1109/ICC.2012.6363989.

Delany, S. J. et al., SMS Spam Filtering: Methods and Data. Expert systems and Application (2012) doi: 10.1016/j.eswa.2012.02.053, 10 pages.

* cited by examiner

Your entry in our drawing WON you a free $500. Code NYP.
Your entry in our drawing WON you $1000. Code AYP.
Your entry in our contest WON you a free $1500. Code NYZ.
Your entry in our drawing WON you $250. Code ZXP.
Your entry in our drawing WON you a free $300. Code ASD.
Your entry in our contest WON you $600. Code DFY.
Your entry in our drawing WON you a free $700. Code FGH.
Your entry in our drawing WON you $800. Code MNT.
Your entry in our contest WON you a free $900. Code PLE.

FIG. 1

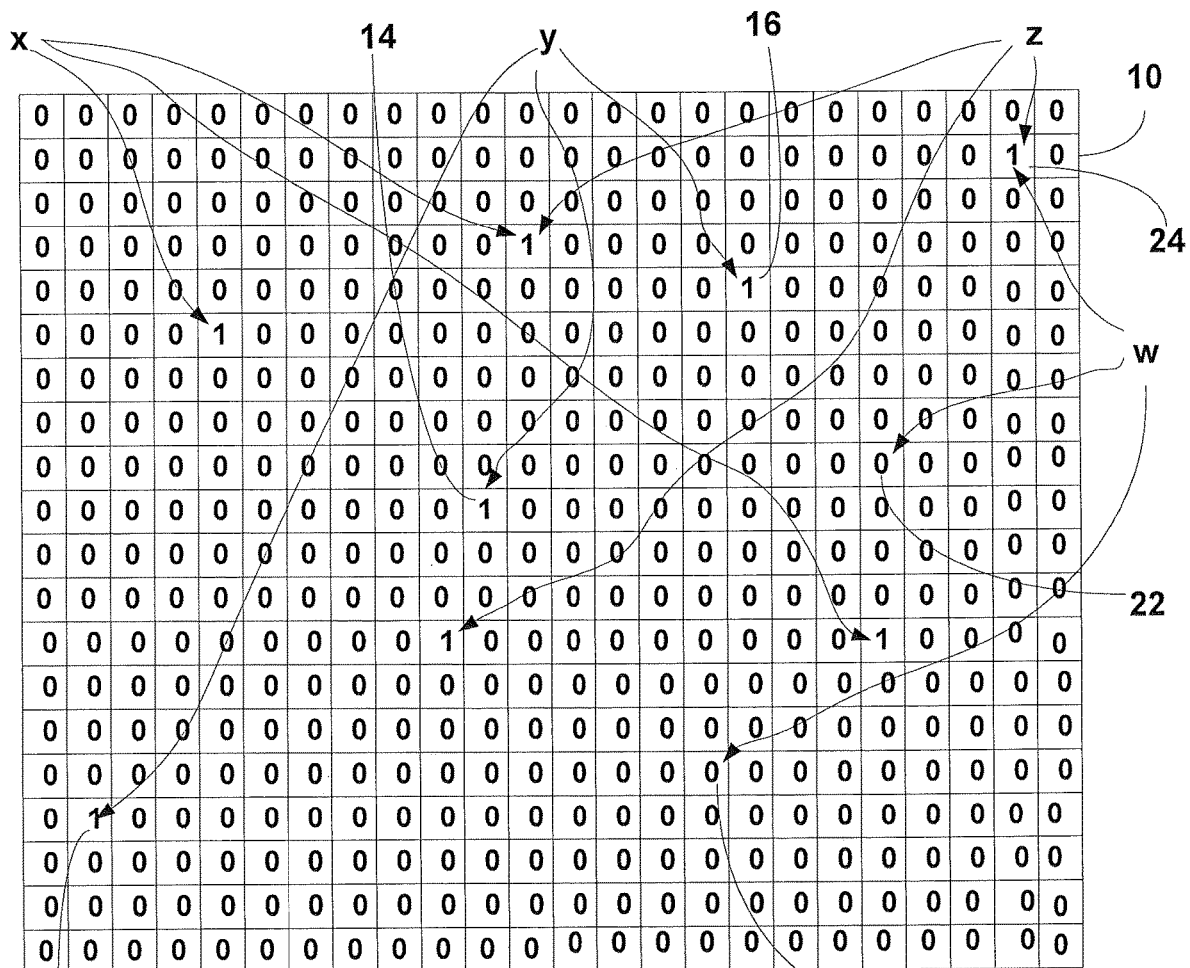

FIG. 2

You won $50

You won $60

You won $70

You won $80

You won $90

DETECTION OF SPAM MESSAGES

CROSS-REFERENCE TO RELATED APPLICATION

This patent application is a continuation of U.S. application Ser. No. 14/264,159 filed Apr. 29, 2014 and since issued as U.S. Pat. No. 10,333,877, which is incorporated herein by reference in its entirety.

FIELD

The present disclosure relates generally to electronic communication systems and, more particularly, to systems and methods for identifying spam messages that are transmitted over such communications systems.

BACKGROUND

Text-based electronic communications such as e-mail messages, text messages, instant messages, facsimiles and the like are now in wide use around the world. As the use of such text-based electronic communications has increased, so has its misuse. One such misuse is the transmission of very large numbers of unsolicited electronic messages over the communications network. Such unsolicited bulk messages are typically referred to as electronic spam or "spam" for short, and the individuals or entities that transmit spam are often referred to as "spammers." Transmitting electronic spam may be a relatively low cost operation for the spammer, as they may need only obtain and manage lists of electronic addresses such as e-mail addresses, Short Message Service ("SMS") addresses, etc. to which the spam messages will be sent and, for some types of spam such as SMS spam, maintain one or more valid user accounts that the spam will be sent from. In contrast, spam may impose significant costs on the communication network provider(s) (internet service providers; cellular telephone operators, etc.), as they must ensure that the network has sufficient communications capacity to timely deliver all of the messages transmitted by network users/subscribers, including large volumes of spam. While the communications network providers presumably pass these costs along to subscribers, only a very small percentage of the subscribers are spammers, and hence the non-spammer subscribers bear almost all of the costs that spam imposes on the network provider. Most often spam is used for advertising purposes, but it also may be used for more nefarious purposes including, for example, as a means for tricking recipients into sending money or disclosing confidential information, or for tricking recipients into subscribing for premium services. In addition, spam may also be used for malicious purposes such as propagating electronic viruses and/or as a means of gaining control of the electronic devices that receive the spam and/or of gaining access to content such as passwords, account numbers, credit card information, etc. that is stored on such electronic devices.

Spam is also problematic because the vast majority of spam recipients find it annoying. Moreover, reviewing messages to determine which are spam and which deserve attention is time-consuming, and also may be error prone such that spam recipients may inadvertently delete, ignore or overlook legitimate messages believing that they are spam. Moreover, for some forms of text-based electronic communications, recipients of the communication may be charged on a per message basis. For these types of communications, spam may force subscribers to pay for messages that they did not ask to receive and which they do not want to receive. Thus, spam may result in dissatisfied subscribers, complaints that must be handled by customer service centers and other negative consequences for the communication network provider. Additionally, in some cases electronic spammers may take control of the electronic devices of others to transmit the spam messages, thus making it much more difficult to identify the real source of the spam (and perhaps incurring charges on the account of the electronic device that was "hijacked" by the spammer). While various efforts have been made by legislative bodies (i.e., laws making it illegal to send spam messages) and by communication network providers to control and reduce the amount of spam, the problem of spam continues to get worse over time as spammers use more sophisticated spamming techniques.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide methods of generating a signature for a group of electronic messages in which a plurality of blocks of characters are extracted from each of the electronic messages. Each of the plurality of blocks of characters from each of the electronic messages are then mathematically processed, and a signature is generated for the group of electronic messages based on the mathematically processed blocks of characters. The messages may be, for example, SMS messages.

In some embodiments, the blocks of characters are mathematically processed by inputting each of the blocks of characters into a counting Bloom filter to generate a Bloom filter output array for the group of electronic messages. The blocks of characters may be, for example, blocks of n-consecutive characters. In some embodiments, 3, each unique combination of n-consecutive characters may be extracted from each of the electronic messages. In some embodiments, the group of electronic messages may be a group of electronic messages for which more than half of the blocks of n-consecutive characters for each of the electronic messages are the same. In some embodiments, non-zero entries may be deleted from the Bloom filter output array that are based on groups of n-characters that were not the same for every one of the group of electronic messages.

In some embodiments, the group of electronic messages may be a first group of electronic messages that were transmitted from a first user account and the signature may be a first signature. In such embodiments, a second signature may be generated for a second group of one or more electronic messages from a second user account, and the second signature may be compared to the first signature. This comparison of the first and second signatures may, for example, involve determining if the second signature includes everything that is contained in the first signature. The first signature may only comprise the positions in the Bloom filter output array which were incremented by every electronic message in the first group of electronic messages.

Pursuant to further embodiments of the present invention, methods of identifying a user account as a potential source of electronic spam are provided in which a plurality of messages that were transmitted from the user account are processed through a counting Bloom filter to generate a Bloom filter output array for the messages. An entropy of Bloom filter output array may then be determined. The user account may be identified as a potential source of spam if the entropy of the Bloom filter output array is below a predetermined threshold.

In some embodiments, a signature for the user account may be specified based on the Bloom filter output array. For example, in some embodiments, the signature may be the Bloom filter output array. In other embodiments, the signature may be the positions in the Bloom filter output array that are non-zero for every message that was input to the counting Bloom filter. The signature may be a first signature, and this first signature may then be compared to a second signature. The second signature may be a signature of a known spam message or a signature of a known spam campaign. The second signature may be generated at least in part by inputting one or more known spam messages through the counting Bloom filter that was used to generate the first signature.

Pursuant to further embodiments of the present invention, methods of identifying spam SMS messages are provided in which hash functions are performed on a group of SMS messages. A signature is generated for the group of SMS messages using outputs from the hash functions. This signature is then used to identify SMS messages that are spam.

In some embodiments, the signature is generated based solely on portions of the group of SMS messages that are identical. In some embodiments, the hash functions are performed by inputting the SMS messages to a counting Bloom filter. In these embodiments, the Bloom filter output arrays for a plurality of additional SMS messages may be compared to the signature and ones of the plurality of additional SMS messages may be identified as spam if they have a Bloom filter output array having non-zero positions for every position in the signature.

Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE FIGURES

Other features of exemplary embodiments will be more readily understood from the following detailed description of specific embodiments thereof when read in conjunction with the accompanying drawings, in which:

FIG. 1 is a schematic diagram illustrating a series of similar messages that may be transmitted from one or more user accounts as part of a spam campaign.

FIG. 2 is a schematic diagram illustrating how a Bloom filter may map input data to a Bloom filter output array.

FIGS. 7C and 7D represent the messages of two different spam campaigns.

DETAILED DESCRIPTION

Figure 3:
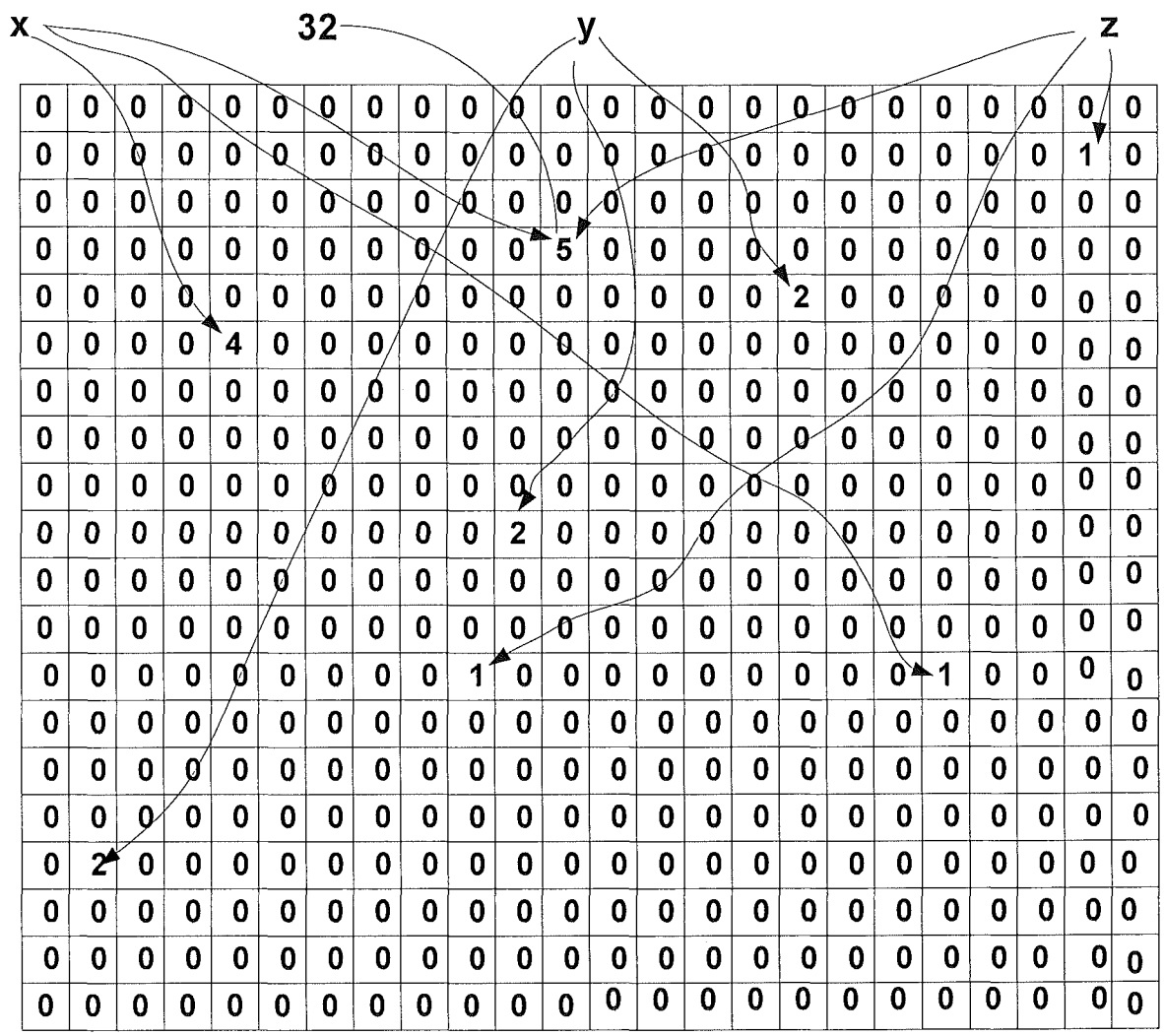
FIG. 3 is a schematic diagram illustrating how a counting Bloom filter may be used to count the number of times that a series of blocks of input data are mapped to positions in a Bloom filter output array.

While the invention is susceptible to various modifications and alternative forms, specific embodiments thereof are shown by way of example in the drawings and are described in detail herein. It should be understood, however, that there is no intent to limit the invention to the particular forms disclosed, but to the contrary, the invention is to cover all modifications, equivalents, and alternatives falling within the spirit and scope of the invention as defined by the claims.

Pursuant to some embodiments, methods are provided for generating a signature for a group of electronic messages that may be used to identify spam. The signatures created according to these embodiments may be more robust than the signatures used in conventional spam mitigation techniques, and may be used to detect spam even if the spammer makes slight modifications to each message in an effort to frustrate conventional spam mitigation techniques. The techniques according to some embodiments may be used to generate "spam signatures" that may be tested against network traffic to identify the slightly varied messages that are part of a spam campaign. The techniques according to some embodiments may also be used to generate a signature for a subscriber account (an "account signature") that may be used to identify accounts that are more likely to be transmitting spam. The techniques according to some embodiments may be used in a wide variety of communications networks including, for example, in cellular telephone networks that transmit SMS text messages and/or Multimedia Messaging Service ("MMS") multimedia messages. Herein, a "signature" refers to a representation for a message or a group of messages. A "spam signature" thus refers to representation for a spam message or a group of spam messages, while an "account signature" refers to a representation for a group of messages transmitted by a particular user/subscriber account. The signatures that are identified in various embodiments may be compared to other signatures as part of a process for identifying spam messages and/or accounts that are transmitting spam.

In some embodiments, the spam signatures and/or account signatures may be generated by breaking each message in a group of messages down into blocks of characters such as groups of n-consecutive characters, and then inputting each block of characters into a counting Bloom filter. The group of messages may be, for example, a series of similar messages that are part of a known spam campaign or a series of messages from a specific subscriber account. If the messages are similar to each other, this fact will be reflected in the Bloom filter output array that is generated by the counting Bloom filter. Moreover, in some cases, the system may be designed so that only the portions of a group of messages that are identical to each other will affect the signature that is generated. For example, the spam signature may be defined as the positions in the Bloom filter output array that were incremented by every message fed into the counting Bloom filter. In such cases, if a plurality of messages from a spam campaign are used to generate a spam signature, then new messages that are traversing the network may be searched for this exact spam signature (i.e., messages that increment those exact same positions in the Bloom filter output array) in order to identify additional subscriber accounts that are transmitting messages that are part of the spam campaign. These techniques may be effective even if the spammer varies the new messages slightly in an effort to avoid more conventional spam mitigation techniques.

Example embodiments will now be described in greater detail with reference to the accompanying drawings.

In response to the ever-increasing volume of spam, network service providers now routinely examine at least some of the messages that are transmitted over their network in an effort to identify spam. One way to accomplish this is to examine individual messages for keywords that are associated with spam messages. For example, spammers that send out spam for advertising purposes often transmit a large number of messages that include the uniform resource locator ("URL") for a particular website. As the spammer wants to encourage visits to the website at issue, the URL may be a necessary part of every spam message. Thus, once it has been determined that a spammer is sending out spam that includes a particular URL, messages traversing the network may be searched for the URL at issue as a means of identifying spam or potential spam messages. Other keywords may also be used, but in some spam mitigation schemes it may be important to identify keywords that will not ordinarily be found in non-spam messages.

Another technique for mitigating spam involves searching the messages flowing through the network to find messages that are identical to prior messages that have already been identified as spam. Spam messages may be identified in response to customer complaints or by numerous other means. Part or all of these known spam messages may be used as a "spam signature" or used to create a "spam signature" for the known spam message. For example, a hash function may be performed on a known spam message to generate a hash value for the known spam message. The same hash function may then be applied to other messages that are transmitted over the network, and if any of these messages return the hash value of the known spam messages, it is highly likely that these messages comprises spam. Using this or similar techniques, many or all of the messages that are transmitted over the network may be searched to identify likely spam messages and, just as importantly, the user/subscriber accounts that are transmitting such messages. Spam that is identified via these techniques may then be blocked by the network (e.g., with e-mail messages) in order to reduce the amount of network resources that are wasted handling spam or, alternatively, the network may identify the user/subscriber accounts transmitting the spam messages and then terminate those accounts (e.g., with SMS text messages). Both of the above-described techniques may be effective against naïve spammers that transmit large numbers of identical messages.

Another spam mitigation technique involves the use of Bayesian filters. Bayesian filtering techniques apply probabilities to individual words in an electronic message that are used to make a determination as to whether or not the message is spam. Typically, a threshold is specified which if exceeded for any message that is run through the filter, then the message is identified as likely comprising spam. For example, numerous spam e-mail messages have been sent for the online sale of Viagra®. A Baysian filter might be programmed to look for the word "Viagra" along with other words or characters such as a dollar sign ("$"), "online", "cheap" and the like. If a message that was input to this Baysian filter had sufficient of these "spam indicators" then the application of the probabilities to the individual words and characters may exceed the threshold that has been set for the Baysian filter such that the message is identified as likely comprising spam.

More sophisticated spammers may evade the above-described techniques by, for example, slightly modifying the spelling or words used in each spam message so it will not match identified spam signatures. For instance, in order to avoid the above-described Baysian filter spam mitigation techniques, online sellers of Viagra (or drugs purporting to be Viagra) may change the spelling of "Viagra" to, for example, "V!agra." Another technique that has been used by spammers is to transmit spam messages that have slight variations from each other so that essentially the same message may be sent in bulk. A computer program may be written at very low cost that creates a series of messages that include slight variations from each other. By slightly varying the spam messages used in a spam campaign a spammer may be able to prevent the spam detection methods employed by network service providers from identifying the messages as spam.

While spam has and continues to be a problem with most forms of electronic messaging, it is a growing problem with SMS messages that cellular telephone operators use for text messaging. This is particularly true as it is now simple to send SMS messages from Internet-connected computers, tablets and the like to cellular telephones, making it much easier for spammers to generate and transmit SMS spam. Spam is particularly insidious in text messaging contexts, as many customers pay for text messaging on a "per message" basis, as opposed to a monthly charge for unlimited texting, such that a subscriber is charged a small fee for each text that is transmitted or received from the subscriber account. Thus, subscribers receiving spam messages end up being charged for receiving messages that they did not request nor want, which may result in highly dissatisfied customers, customer service complaints, demands for billing adjustments and the like.

While traditionally SMS spam has been sent from dedicated mobile accounts that are owned by the spammers, more recently spam botnets have been employed that turn the cellular telephones of legitimate subscribers into spam transmission platforms. This may make it much more difficult to identify and block spammers, as the line between legitimate users and spammers may become blurred. This also can result in very large texting charges being assessed against legitimate subscribers whose cellular telephones were taken over by the botnet and turned into spam transmission platforms.

Fortunately, SMS messages also have other characteristics that may make them more amenable to spam mitigation techniques. In particular, SMS messages typically have a maximum length of 160 characters, which is mapped to 140 bytes (some services are limited to 140 characters because 20 characters are reserved for control purposes). Because so few characters are allowed, there is only a limited ability to vary the content of a spam SMS message while still conveying the information that the message must include to serve its intended purpose. Thus, even if SMS spammers attempt to vary the messages that are part of the same spam campaign, there will typically still be a high degree of overlap between the different messages.

As noted above, techniques are disclosed herein for identifying spam even when the spammers use more sophisticated approaches to avoid conventional spam mitigation systems. FIG. 1 shows an example series of SMS messages that a more sophisticated spammer might send from a cellular telephone account as part of a spam campaign. As is readily apparent from FIG. 1, the messages are very similar, but have minor variations that are emphasized in FIG. 1 via underlining to make the differences more apparent. Typically, a spammer wants to get a certain message out to a large number of recipients. In order to do this cheaply, it is generally necessary to include very similar content in all of the messages, because it may be prohibitively time-consuming and expensive to prepare large numbers of different messages that convey the same general information. The techniques disclosed herein may take advantage of the fact that the messages that are part of a "spam campaign" of even a sophisticated spammer will generally have a significant amount of identical content that may be used to identify spam messages.

Pursuant to some embodiments, a robust signature may be built for a group of messages. In some cases, this signature may be a "spam signature" that is built based on a group of known spam messages that are all part of the same spam campaign (i.e., each message has a small number of minor variations from a template message), or may simply be a series of messages that were transmitted from a particular subscriber account. The robust signatures may be built, for example, by considering each message as a set of character blocks, where a high percentage of these character blocks are included in all the messages of the spam campaign. In some embodiments, the only character blocks that are used to generate the spam signature are the character blocks that are identical across a series of messages. Thus, in such embodiments, in the example of FIG. 1 the character blocks that would contribute to the signature would only be character blocks that did not include the words that are underlined in FIG. 1. In other embodiments, all (or nearly all) of the character blocks may be used instead to generate the spam signature, as will become clear from the example embodiments described below.

In some embodiments, the spam signature (or account signature) may be generated using a counting Bloom filter. A Bloom filter is a space-efficient probabilistic data structure that may be used to test whether an element is a member of a set. A Bloom filter can be used to definitively determine that an element is not within a set (i.e., a Bloom filter can be designed so that it will not generate false negatives), but typically a Bloom filter cannot definitively determine whether or not the element is within a set (i.e., a Bloom filter may return false positives).

Bloom filters apply one or more hash functions to data that is input thereto in order to test whether or not an input data set is a member of a set. A hash function refers to an algorithm that maps data of arbitrary length to data of fixed length. The value returned by applying a hash function to input data is referred to as a hash value. The hash values provide fixed length shortened references to the original input data. Hash functions are "deterministic," meaning that when they are invoked on the same input data the hash function will always produce the same hash value. However, since the hash values are shortened references to the original data, it generally is not possible to reconstruct the original input data from its hash value alone, since multiple input data sets may hash to the same hash value. Moreover, some hash functions may be designed as cryptographic hash functions that are intentionally designed to be one-way. Such cryptographic hash functions may be used in the Bloom filters according to some embodiments.

The output of a Bloom filter—which is referred to herein as a Bloom filter output array—can be viewed as a bit array that includes m bits or "positions." For purposes of illustration, the Bloom filter output arrays depicted in the drawings comprise two dimensional arrays having i row and j columns, but it will be appreciated that any appropriate representation may be used (e.g., a vector having m bits, a three dimensional array, etc.). The Bloom filter may also define k different hash functions. Each of the k hash functions maps (hashes) input data that is input to the Bloom filter to one of the m positions in the Bloom filter output array, typically with a uniform random distribution. Thus, a Bloom filter processes an element of input data through the k hash functions to obtain k positions in the Bloom filter output array, and sets the bit in each of the identified k positions in the Bloom filter output array to a value of 1. When no data has been input to a Bloom filter, the corresponding Bloom filter output array is "empty," meaning that all m bits in the Bloom filter output array will have a value of zero.

FIG. 2 is a schematic drawing of a simple example illustrating how a Bloom filter may be used to map three elements of input data (x, y, z) to a Bloom filter output array 10 having 520 positions (m=520) using three hash functions (k=3). The input data x, y, and z may each be a single character, a series of characters, a word, a sentence, a whole message, etc. Each element of input data (x, y, z) may have any number of characters. In FIG. 2, arrows are provided that illustrate the positions in the Bloom filter output array that the k hash functions map each element of input data (x, y, z) to. As shown in FIG. 2, once processed by the Bloom filter, input data sets x, y, and z are all within the Bloom filter output array, as the k hash functions map these data sets to positions in the array that all have the value of 1. By way of example, when data element y is input to the Bloom filter, the positions labeled 12, 14 and 16 in the Bloom filter output array 10 are changed from zero to one.

Once created, the Bloom filter output array 10 of FIG. 2 may be used to test new input data to determine whether or not this new data is within the set of data stored in the Bloom filter output array 10. If the new input data is x, y or z, then when the hash functions are performed on this data, the exact same positions in the Bloom filter output array for the new data will be changed from zero to one. For example, if y is input to the Bloom filter, then positions 12, 14 and 16 in the Bloom filter output array for the new data will be changed from zero to one. Since these same positions in the Bloom filter output array 10 that was generated using the original data set of (x, y, z) also have values of one, a comparison of the two Bloom filter output arrays suggests that the new data y is within the set of data stored in the Bloom filter output array 10. As noted above, since Bloom filters can generate false positives this will not necessarily be a definitive determination that the new input data is within the set.

A data set w is also illustrated in FIG. 2. This data set w was not input to the original Bloom filter. Had it been, it would map to the three positions 22, 24, 26 illustrated in FIG. 2. Thus, if w is later input to the Bloom filter, it will map to three positions in a Bloom filter output the array (namely positions 22, 24, 26), two of which (22, 26) will have a value of zero in Bloom filter output array 10. Thus, the Bloom filter may be used to process data set w and determine that it is not within the Bloom filter output array 10 (since it hashes to at least one position in the Bloom filter output array 10 that has a value of zero). Thus, the Bloom filter may be used to determine whether new data sets match any data sets that were previously stored within the Bloom filter. As noted above, the Bloom filter can conclusively tell if the new data set is not within the Bloom filter, but an indication that the new data set is within the Bloom filter is not deterministic; it may be, or it may be a false positive. Typically the Bloom filter will be designed to have an acceptably small false positive rate.

A counting Bloom filter is a special type of Bloom filter that may be used to count the number of times that input data is mapped to positions in a Bloom filter output array. Thus, in contrast to the Bloom filter output array for a normal Bloom filter, in which each position in the array may have a value of zero or a value of one, each position in the Bloom filter output array for a counting Bloom filter is a counter that counts the number of times that input data maps to that position. FIG. 3 depicts the Bloom filter output array of a counting Bloom filter that uses the same three hash functions as the Bloom filter of FIG. 2. In the example of FIG. 3, the same input data (namely x, y, and z) is input to the counting Bloom filter except that some of these input data elements are entered multiple times (i.e., as shown in FIG. 3, input data x, y, x, z, x, y, x is input to the counting Bloom filter).

In the example of FIG. 3, each time data is input to the counting Bloom filter the positions in the Bloom filter output array that the data hashes to is incremented. Thus, since data "x" is input to the counting Bloom filter four times, each position in the Bloom filter output array that corresponds to data "x" is incremented four times. Likewise, since data "y" is input to the counting Bloom filter twice, each position in the Bloom filter output array that corresponds to data "y" is incremented twice, and since data "z" is input to the counting Bloom filter one time, each position in the Bloom filter output array that corresponds to data "z" is incremented once. Since the Bloom filter hashes both data "x" and data "z" to an identical position in the Bloom filter output array (position 32), one value in the Bloom filter output array is incremented to a value of five to reflect the four entries of data "x" and the one entry of data "z."

Figure 4:
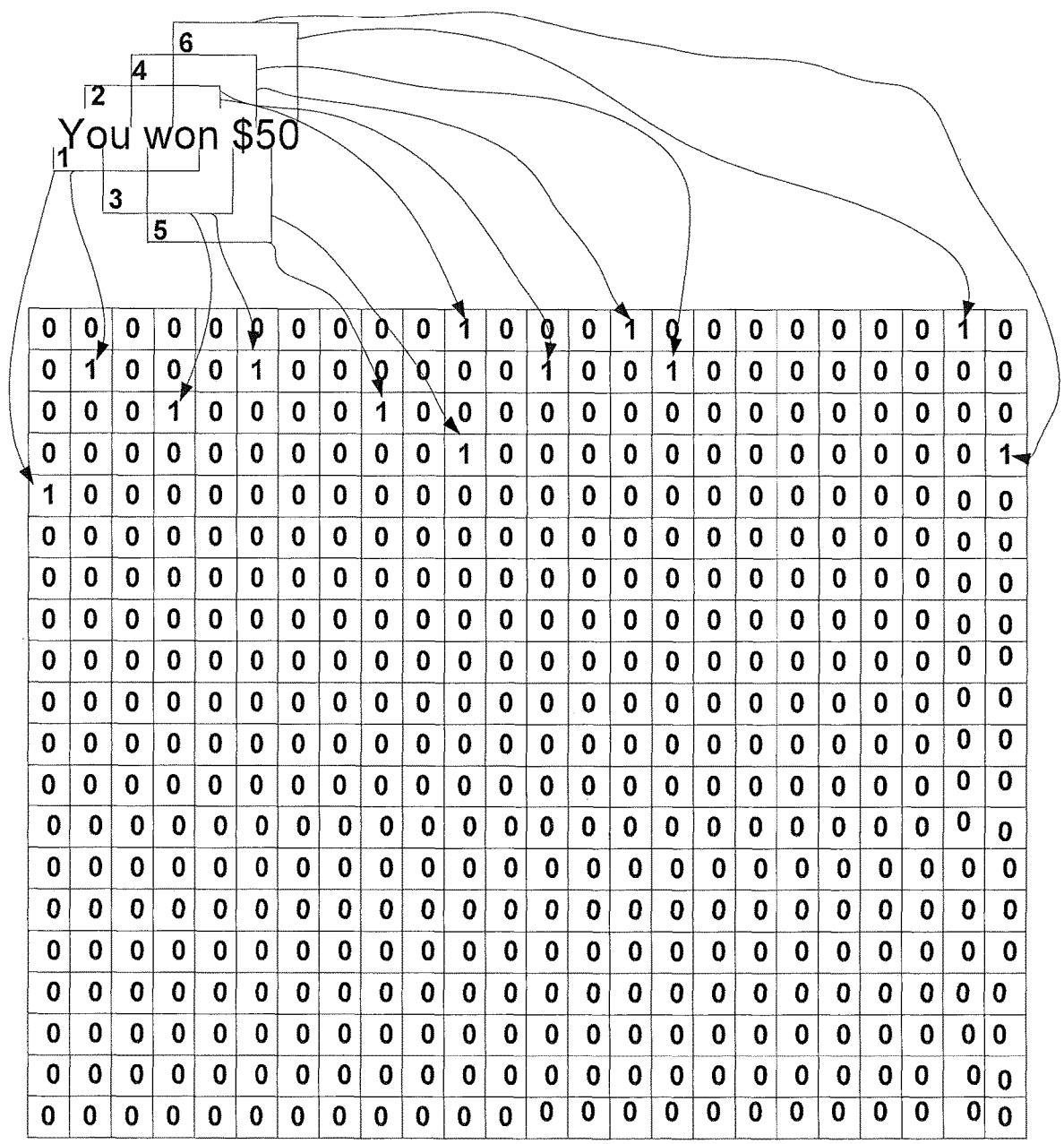
FIG. 4 is a schematic diagram illustrating how a message may be sub-divided into a series of blocks of characters such as n-grams and how each n-gram may be mapped to positions in a Bloom filter output array.

FIG. 4 is a schematic diagram illustrating how messages such as an SMS message may be sub-divided into a series of blocks, and each block may then be input to a counting Bloom filter in order to create a signature for a group of messages. As shown in FIG. 4, an example message ("You won $50") is broken into blocks of n consecutive characters. Each such block of n characters may be referred to herein as an "n-gram." The n-grams may be generated, for example, by taking the first n characters from the message to create a first n-gram, moving one character to the right and then using the next n characters to create a second n-gram, etc. until most or all of the characters in the message have been used. This approach is used in the example of FIG. 4 such that the message is broken down into a total of six n-grams, which are shown by the numbered brackets included above and below the message. The n-grams generated by this technique may then be input one at a time into the counting Bloom filter which performs k hash functions on each n-gram to generate a hash value for the n-gram, and the counting Bloom filter generates a Bloom filter output array in which the positions that correspond to the hash values are incremented. In FIG. 4, lines with arrows are provided that show how each n-gram maps to k positions (in this example k=2 for simplicity) in the Bloom filter output array. To simplify the drawing, all of these positions are shown as being near the top of the Bloom filter output array, but it will be understood that a more even distribution will generally be expected. Moreover, in the example of FIG. 4 none of the six n-grams mapped to the same position in the Bloom filter output array, but it will be appreciated that this typically will occur if even moderate amounts of data are processed through the counting Bloom filter.

As noted above, it may be desirable to obtain a spam signature for the messages of a spam campaign where the spammer has included slight to moderate variations in the messages included in the spam campaign. When such messages are input to the counting Bloom filter, since the messages may in large part be identical to each other, each spam message will have many n-grams that are identical to the n-grams in the other spam messages that are input to the counting Bloom filter. Consequently, many of the same positions in the Bloom filter output array will keep getting incremented and end up with high values (e.g., values the same as or nearly the same as the number of messages fed into the counting Bloom filter). This result occurs because the portions of each message that are identical to the corresponding portions of other messages will generate identical n-grams, and these identical n-grams keep incrementing the same positions in the Bloom filter output array. Likewise, many other positions in the Bloom filter output array will be zero or close to zero.

Figure 5:
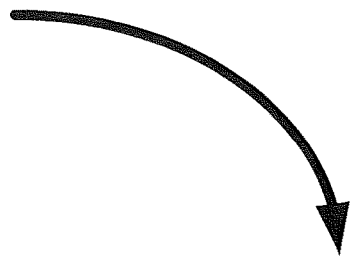
FIG. 5 is a schematic diagram illustrating how the n-grams extracted from a series of messages may map to a Bloom filter output array.

FIG. 5 is a schematic diagram illustrating how a series of messages may be input to a counting Bloom filter to generate a spam signature for the messages of a spam campaign. The series of spam messages are shown at the top of FIG. 5. As is readily apparent, the first message in the series is the same message illustrated in FIG. 4, and the remaining messages in the spam campaign are slight variations of the first message. In the example of FIG. 5, the same counting Bloom filter is used as was used in the example of FIG. 4.

While arrows are not used in FIG. 5 to improve the readability of the figure, it will be understood that the six n-grams that are included in the first message in the spam campaign (which are shown using brackets in FIG. 5) will map to the exact same locations in the Bloom filter output array of FIG. 5 as they did in the Bloom filter output array of FIG. 4, since both examples use the same Bloom filter. Moreover, as the first four n-grams that are included in all five messages in the spam campaign are identical, the first four n-grams from all five messages will map to the exact same locations in the Bloom filter output array. This can be seen in FIG. 5 by the array positions that have values of five. However, the last two n-grams for each of the five messages will be different because of the varying dollar amounts in the five messages. Thus, each of these five messages results in two other positions in the Bloom filter output array being incremented to a value of one. Thus, the Bloom filter output array has eight positions with values of five, ten positions with values of one, and all the remaining positions have values of zero. Note that in this example it was assumed that all non-identical n-grams in the spam campaign mapped to unique locations in the Bloom filter output array.

Pursuant to some embodiments, signatures may be generated by inputting a series of messages that are broken down into n-grams into a counting Bloom filter in, for example, the manner discussed above with reference to FIGS. 4-5. Examples as to how signatures generated in the manner may be used for purposes of spam mitigation in a network will now be described.

Figure 6:
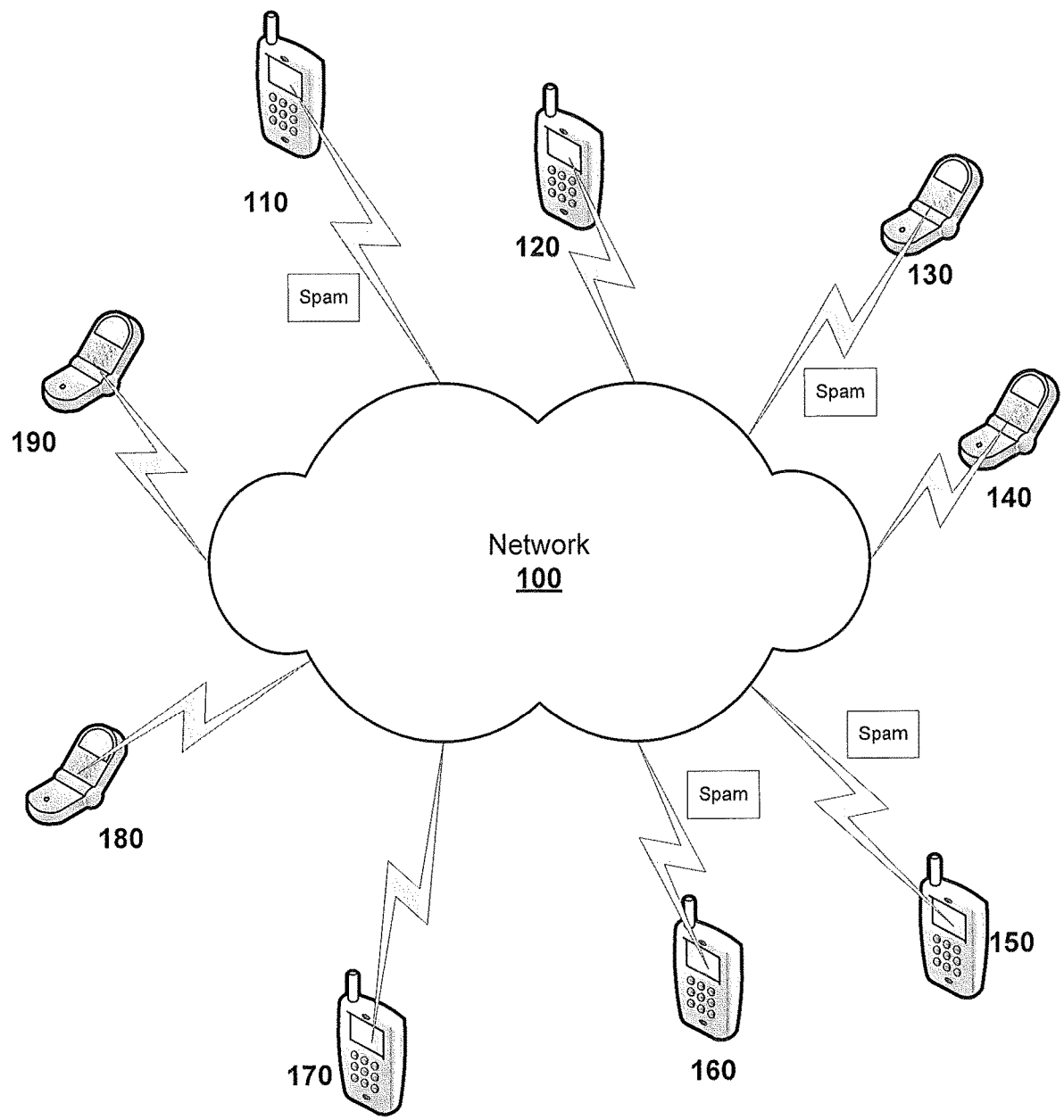
FIG. 6 is a schematic diagram illustrating how a plurality of devices may transmit spam that are part of the same spam campaign.

As one example, a network operator may have awareness of a spam campaign and the general content of the spam messages, but may not know all of the subscriber accounts that the spam messages are being transmitted from. This may occur, for example, when a spammer subscribes to multiple accounts or when a spammer uses a botnet to turn legitimate subscriber accounts into spam transmission platforms. This situation is illustrated graphically in FIG. 6. As shown in FIG. 6, the network service provider may have identified a first subscriber account 110 that is sending out spam messages over the network 100 based on, for example, customer complaints or keyword monitoring efforts. The typical response to such a discovery will be for the network service provider to cancel the first subscriber account. However, the spammer may, for example, have multiple subscriber accounts or may use a botnet to turn legitimate subscriber accounts into spam transmission platforms, with the legitimate subscribers being unaware that this is even occurring. The spammer may also or alternatively open new subscriber accounts and use these new accounts to send the spam messages. Thus, as shown in FIG. 6, there may be a plurality of additional subscriber accounts 130, 150, 160 that are transmitting spam messages that are part of the same spam campaign.

Since the messages from the first user account 110 comprise known spam messages, a series of these spam messages may be input to a counting Bloom filter in, for example, the manner described above with reference to FIGS. 4-5. Since the spam messages will have at least a fairly high degree of similarity, the spam messages of the spam campaign will likely include a number of blocks of characters that are identical whereas a series of unrelated messages will typically share few, if any, identical character blocks. Thus, the resulting Bloom filter output array may be used as a spam signature for the messages of the spam campaign, or may be used to develop such a spam signature. Then, individual messages sent by other user accounts may be input to a Bloom filter that is set with the same hash functions in order to generate a Bloom filter output array for each such message. The Bloom filter output array (or a signature derived therefrom) for these messages may then be compared to the spam signature to determine whether any of these messages are part of the spam campaign. If so, appropriate actions may be taken such as terminating the user account that sent the spam message or uploading a software patch to the transmitting device that blocks the spammer from taking control of the transmitting device.

In some embodiments, the signatures that are generated using the above-described techniques may only be generated based on the character blocks that are common to all messages. Thus, for example, if one thousand messages are input to the counting Bloom filter, then only the positions in the Bloom filter output array that have values of one thousand or more will be included in the spam signature. This may be advantageous because it allows exact comparisons between the spam signature and the signatures of messages that the spam signature is being compared to. For example, with reference to FIG. 5, the spam signature may be defined as the positions of the Bloom filter output array of FIG. 5 that have values of 5 or more. Messages traversing the network may then be input to a Bloom filter and if the Bloom filter output array has non-zero entries in these positions, then it is considered to match the spam signature. Additional constraints may be added such as, for example, a requirement that some percentage of the positions in the Bloom filter output array have the value of zero to reduce the possibility that a long message may inadvertently result in a match to the signature.

In other embodiments, the signature for the series of spam messages may be based on all of the character blocks (n-grams) that are input to the counting Bloom filter. In such embodiments, messages traversing the network may be input to a Bloom filter to obtain a signature for these messages and comparisons may be made to the similarity of the signatures of these messages to the spam signature. For example, a Hamming or Euclidean distance may be computed between the spam signature and signature of the messages traversing the network. Since the messages that are part of the spam campaign are all similar, the spam signature that is generated using the group of messages from the spam campaign will be similar to any of the individual messages of the spam campaign. As such, any message from the spam campaign will correlate highly with the spam signature. In such embodiments, exact matches are not expected, but if the correlation is high between the Bloom filter output array for a message and the spam signature then the message is likely spam.

Thus, as shown in the example of FIG. 6, pursuant to some embodiments, a spam signature may be developed that may be used to identify the messages of a known spam campaign even though the spammer varies the messages that are part of the spam campaign in an effort to evade spam detection techniques that, for example, compare hashes of the entire content of a known spam message. These techniques may be used to identify additional subscriber accounts that are transmitting messages that are part of the same spam campaign so that those subscriber accounts may be shut down or other corrective actions taken.

A network operator may also use the signature generation techniques that are disclosed herein to evaluate whether particular subscriber accounts are transmitting a large number of messages that have similar content. This may be done, for example, by inputting a series of messages from a subscriber account into a counting Bloom filter to obtain a Bloom filter output array in, for example, the manner described above with reference to FIG. 5. The Bloom filter output array may then be used as an account signature for the subscriber account, or may be used to create an account signature for the subscriber account. This account signature may then be used in various ways to identify spam messages and the subscriber accounts that are transmitting these spam messages.

For example, the entropy of the Bloom filter output array that is generated by running a series of messages from a subscriber account through a counting Bloom filter may be computed to provide an indication as to how similar the messages sent by the subscriber account are to each other. Methods of determining the entropy (or some other measure of the degree of similarity/randomness between the messages) are known to those of skill in the art. If the entropy for the subscriber account is below a certain threshold (which may be predefined), then this is an indication that the messages are very similar to each other, which indicates that it is likely that the messages sent from the subscriber account comprise spam. An analyst may, for example, review messages from subscriber accounts having Bloom filter output arrays that have low entropy values to determine if these subscribers are spammers.

The signature for the subscriber account (e.g., the Bloom filter output array generated in the manner discussed above or a normalized version thereof) may also be compared to the spam signatures for known spam messages. For example, the spam signature for a known spam message (or for a campaign of spam messages) may have various positions in a Bloom filter output array that are expected to be non-zero. The account signature for the subscriber account may be generated by inputting a plurality of messages that were transmitted by the subscriber through a counting Bloom filter. If a predefined percentage of the positions in the resulting Bloom filter output array that correspond to signature for the spam message (i.e., the positions in the Bloom filter output array for the known spam message that have non-zero values) have values that are above a certain threshold (e.g., a value equal to 50% of the number of messages run through the counting Bloom filter), this is an indication that the same character blocks (n-grams) from the known spam message are also present many times in the messages that are being sent from the subscriber account. This again is an indication that the subscriber account is transmitting spam messages.

As yet another example, account signatures may be determined for multiple subscriber accounts and these subscriber signatures may then be compared to determine if the subscriber accounts are transmitting similar messages. This can be done, for example, by determining the percentage of the positions in the Bloom filter output array that is generated for each subscriber account in the manner described above that are not empty or that have similar values. This percentage provides an indication as to how many identical character blocks are being transmitted by both subscriber accounts. The higher the percentage, the more likely it is that the two subscriber accounts are transmitting messages that are part of the same spam campaign.

In some embodiments, clustering analysis may also be performed, which may be useful for identifying the subscriber accounts that are participating in different spam campaigns. With clustering analysis, account signatures may be obtained for a set of subscriber accounts in the manner discussed above. These account signatures may then be compared to find "clusters" of subscriber accounts which are transmitting similar messages. This may be done, for example, by grouping subscriber accounts that have account signatures that correlate highly or by any of the other techniques described above for determining whether two subscriber accounts are transmitting similar messages. In this fashion, not only may subscriber accounts that are likely sending spam be identified from a larger group of subscriber accounts, but the subscriber accounts that are likely transmitting spam may then be decomposed into subgroups that are likely participants in different spam campaigns.

In some embodiments, spam messages may be identified automatically without the need for review or intervention by analysts. For example, if a spam signature is already known for a spam message or for a spam campaign, subscriber accounts that are transmitting messages that have a sufficiently high correlation with the known spam signature may be automatically identified as spam. The techniques disclosed herein may be able to identify messages that have sufficient similarity to known spam messages such that they may be used to automatically identify and process messages from the same spam campaign with a high degree of confidence that legitimate messages are not inadvertently being captured by the spam mitigation techniques.

Pursuant to still further embodiments, techniques may be provided which can distinguish between the messages that are part of a spam campaign and other messages that are have identical or similar content that are transmitted in bulk, but which are not spam. For example, many retailers, restaurants and other commercial entities have e-mail, text message or other "mailing" lists which customers may sign up to. The retailer/restaurant uses these mailing lists to send information that the customers have indicated they want to receive such as notifications of sales, coupons, special offers, discounts and the like. Generally, all of the messages that are sent will be the same, although in some cases there may be different classes of recipients who may receive slightly different messages or the messages may include customer specific information (e.g., account numbers, number of points earned, etc.) that may result in some degree of variation between messages. As such, these non-spam messages may have characteristics that are very similar to the characteristics for spam messages.

However, there also may be differences between the above-described non-spam commercial messages and the messages of a spam campaign. For example, when a spam campaign uses a botnet that takes control of user devices and turns them into spam transmitting platforms, the spam campaign will be characterized in that messages will be sent from a large number of user accounts. In contrast, the non-spam commercial activities that are described above will typically be sent from a single user account. Thus, when it is determined that highly similar (or identical) messages are being sent from a multiple (or a large number of) accounts, this is a strong indication that the messages are part of a spam campaign as opposed to messages that the recipients have signed-up to receive.

Figure 7A:
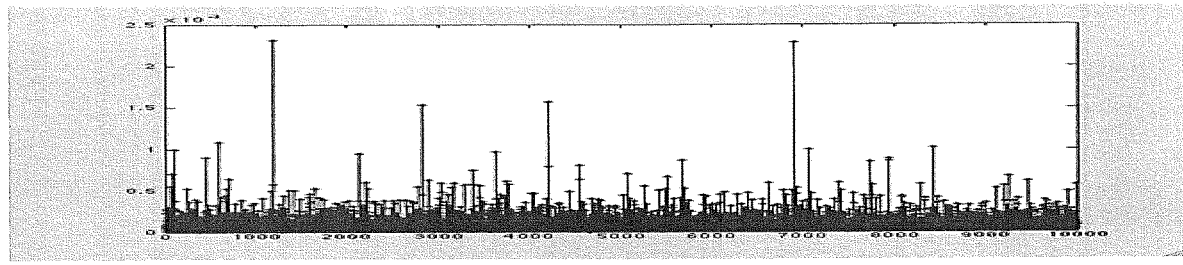
FIGS. 7A-7B are graphs illustrating the Bloom filter output arrays generated by inputting You Tube comments from a plurality of non-spammer user accounts into a counting Bloom filter.
Figure 7B:
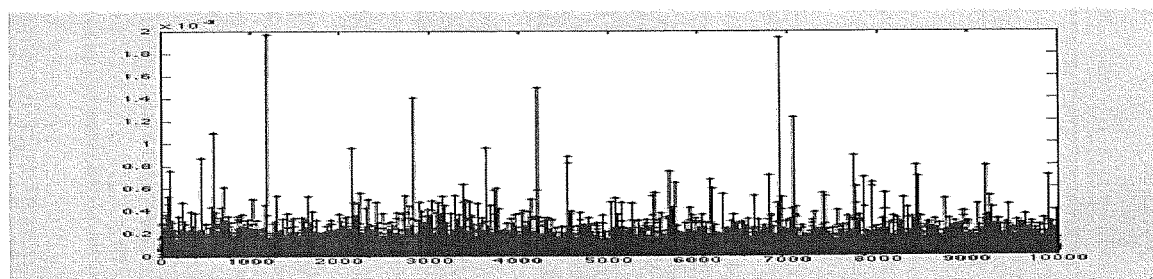
Figure 7C:
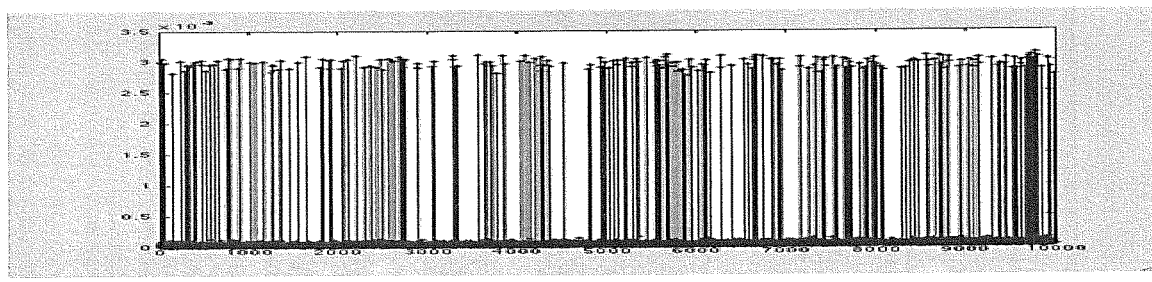
FIGS. 7C-7D are graphs illustrating the Bloom filter output arrays generated by inputting the messages from a plurality of user accounts that are transmitting spam messages into a counting Bloom filter.
Figure 7D:
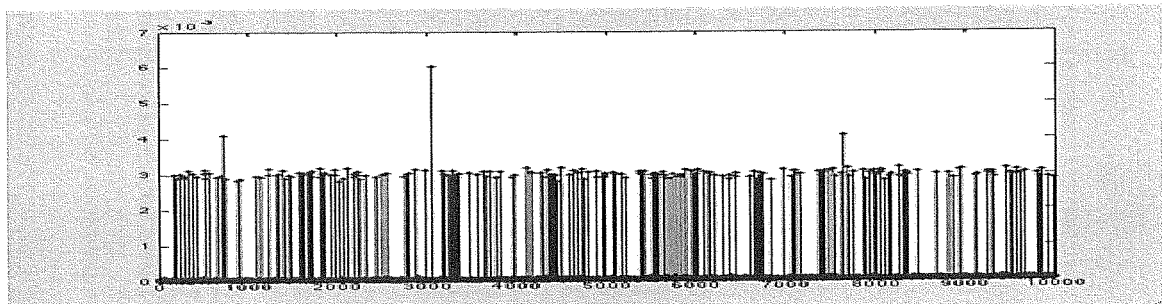

FIGS. 7A-7D are a series of graphs that illustrate the counting Bloom filter output arrays that are generated for (a) messages transmitted from a set of subscriber accounts that were commenting on You Tube videos (FIGS. 7A-7B) and (b) messages transmitted by another set of subscriber accounts that were known spammer accounts (FIGS. 7C-7D). In each of the graphs, the x-axis represents the 10,000 positions in the Bloom filter output array that was generated by inputting the messages at issue through a counting Bloom filter. The y-axis represents the value of each position in the Bloom filter output array. A large number of messages (e.g., tens of thousands of messages) that were transmitted from the account (or received at the account in the case of the You Tube comments) were used to generate the Bloom filter output arrays. The You Tube comments were chosen as a control in this example because the messages would be expected to have some degree of similarity, since the comments were made regarding the same videos, but are not expected to have anywhere near the similarity that is present between the messages of a typical spam campaign.

As shown in FIGS. 7A-7B, the You Tube comments fill in essentially all of the positions in the Bloom filter output array, but the vast majority of the positions in the Bloom filter output array have small values, which indicates that n-grams that map to these positions were not found in a large number of messages. In a relatively small number of positions, medium or high values were obtained. This may occur, for example, because some words and phrases are used frequently in messages either because they are common English words or phrases (e.g., "the," "and", etc.) or because the words relate to content in the You Tube video. N-grams corresponding to these more frequently used words and phrases will be present in a larger percentage of the messages, resulting in the spikes shown in FIGS. 7A-7B.

In contrast, FIGS. 7C-7D show that when the subscriber accounts are transmitting the messages of a spam campaign, a very distinct Bloom filter output array may result. In this example, the messages that were fed into the counting Bloom filter were all part of the same spam campaign, and included slight variations between messages. As shown in FIGS. 7C-7D, the resulting Bloom filter output array has a large number of positions that have high values. This shows that the same n-grams are appearing in most of the messages of the spam campaign. Many other positions in the Bloom filter output array have values at or near zero, which reflects the lack of variation in the messages. In FIG. 7D, there are a few positions in the Bloom filter output array which spike higher. This reflects positions where multiple n-grams in the messages map to the same position in the Bloom filter output array.

Figure 8:
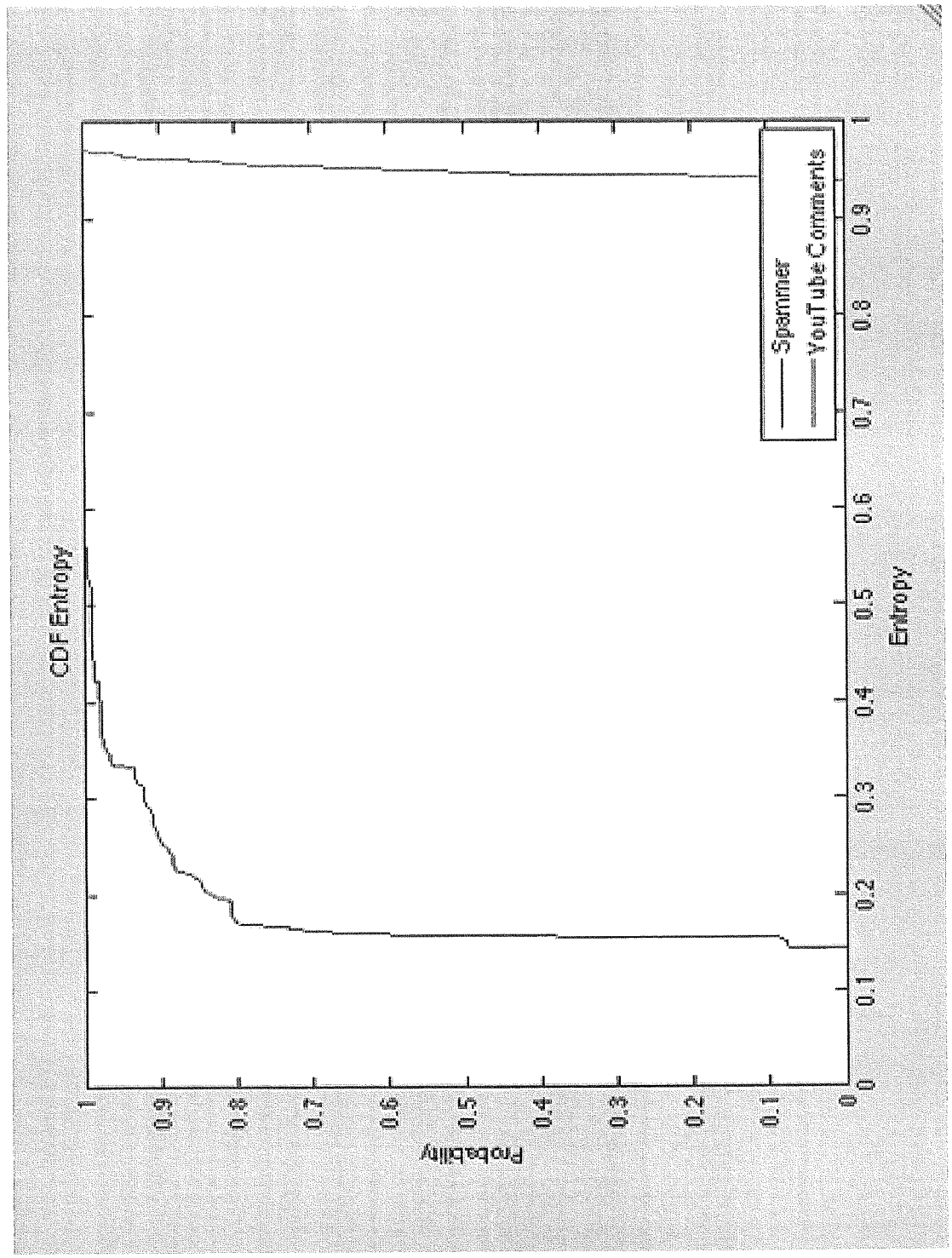
FIG. 8 is a graph illustrating the cumulative distribution of the entropy of a Bloom filter output array that was generated by inserting the messages of one of the spam campaigns of FIGS. 7C-7D into a counting Bloom filter as compared to the cumulative distribution of the entropy of the Bloom filter output array that was generated by inserting the messages associated with one of the You Tube comments of FIGS. 7A-7B into a counting Bloom filter.

FIG. 8 is a graph illustrating the cumulative distribution of the entropy of the Bloom filter output array that was generated by inserting the messages of one of the spam campaigns of FIGS. 7C-7D into a counting Bloom filter as compared to the cumulative distribution of the entropy of the Bloom filter output array that was generated by inserting the messages associated with one of the You Tube comments of FIGS. 7A-7B into a counting Bloom filter. As shown in FIG. 8, the entropy of the messages of the spammers is very low, with almost 90% of the spammers having an entropy of less than 0.2. This indicates that the messages are very similar, In contrast, the entropy of the You Tube video comments is very high, with over 95% of the subscriber accounts having an entropy of 0.94 or more. These radically different entropy values provides a mechanism for distinguishing spam from other types of messages.

Figure 9:
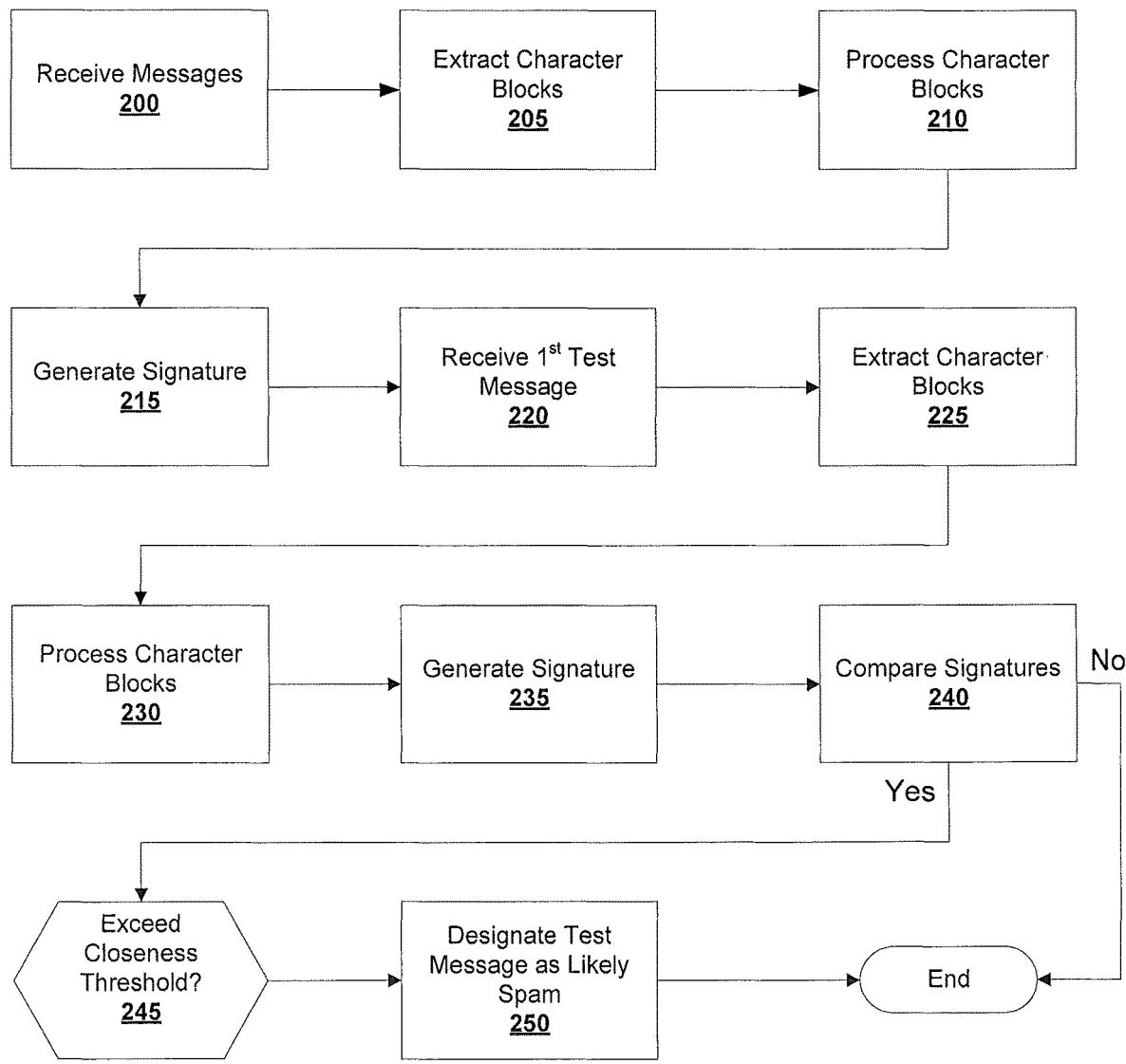
FIG. 9 is a flow chart illustrating operations for a method of generating a signature for a group of electronic messages and then using that signature to detect spam messages.

FIG. 9 is a flow chart illustrating operations for a method of generating a signature for a group of electronic messages and then using that signature to detect spam messages. As shown in FIG. 9, operations may begin with the receipt of a plurality of electronic messages (block 200). The electronic messages may all be transmitted by the same subscriber account or may be transmitted by multiple subscriber accounts. In some embodiments, the received messages may be messages that have been identified as spam messages that are all part of the same spam campaign. In other embodiments, the messages may be a series of messages transmitted by the same subscriber.

As shown in FIG. 9, next a plurality of character blocks may be extracted from each of the received messages (block 205). In some embodiments, this may be done by breaking each message down into a plurality of n-grams, although other techniques may be used. Once the messages have been broken down into character blocks, these character blocks may be mathematically processed (block 210). In some embodiments, this may involve inputting each of the blocks of characters from each electronic message to a counting Bloom filter to generate a Bloom filter output array. Next, a signature may be generated for the group of electronic messages based at least in part on the mathematically processed blocks of characters (block 215). In some embodiments, the Bloom filter output array may comprise the signature. In other embodiments, selected portions of the Bloom filter output array may comprise the signature (e.g., only the non-zero entries in the Bloom filter output array or only the non-zero entries in the Bloom filter output array that are based on groups of n-characters that were not the same for every one of the group of electronic messages).

The signature that is generated for the group of messages may then be used for a variety of purposes including, for example identifying subscriber accounts that are transmitting for spam. For example, as shown in FIG. 9, operations may continue with the receipt of an electronic message (block 220) which will be referred to herein as a "first test message." The first test message may comprise, for example, any message that is transmitted over the communications network. The first test message may be broken down into a plurality of character blocks (block 225). These character blocks may be mathematically processed (block 230) using, for example, the same techniques used in block 210 to mathematically process the character blocks from the group of electronic messages. Next, a signature may be generated for the first test message based at least in part on the mathematically processed blocks of characters (block 235).

Next, the signature for the group of electronic messages may be compared to the signature for the first test message (block 240). In some embodiments, this comparison may involve determining if the second signature includes everything that is contained in the first signature. In other embodiments, the comparison may involve determining how close the two signatures are to each other using some pre-defined definition of "closeness." As shown at block 245 in FIG. 9, if the two signatures are sufficiently close, then the first test message may be identified as comprising a spam message or a message that is likely to be spam (block 250).

Figure 10:
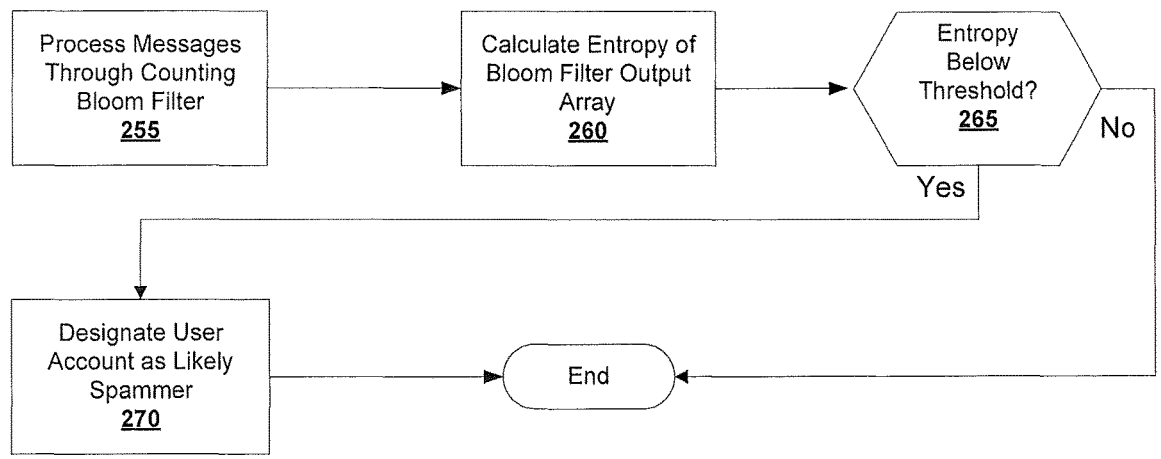
FIG. 10 is a flow chart illustrating operations for a method of identifying a user account as a potential source of spam.

FIG. 10 is a flow chart illustrating operations for a method of identifying a user account as a potential source of spam. As shown in FIG. 10, operations may begin with a plurality of messages that were transmitted from the user account being input to a counting Bloom filter to generate a Bloom filter output array for the plurality of messages (block 255). Then, an entropy value may be calculated for this Bloom filter output array (block 260). The calculated entropy value may then be compared to a threshold (block 265). If the calculated entropy value is below the threshold (block 270), then the user account may be identified as a likely spam source (block 275).

Figure 11:
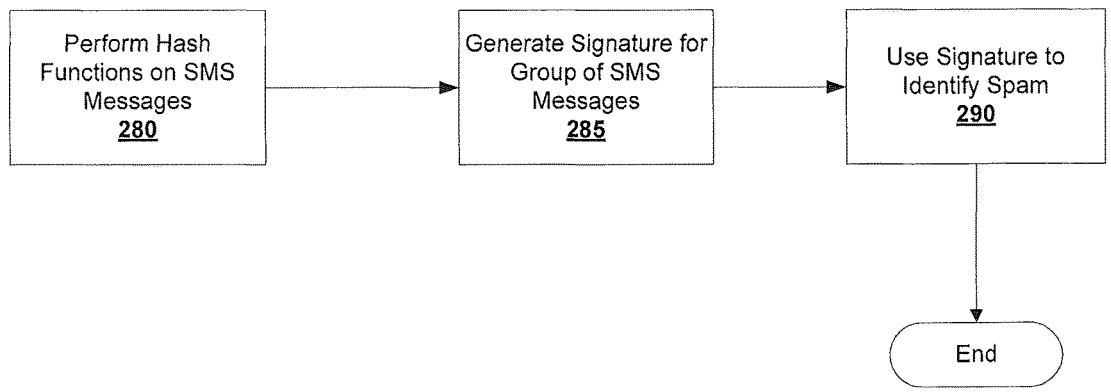
FIG. 11 is a flow chart illustrating operations for a method of identifying spam SMS messages.

FIG. 11 is a flow chart illustrating operations for a method of identifying spam SMS messages.

As shown in FIG. 11, operations may begin with hash functions being performed on a group of SMS messages (block 280). In some embodiments, each SMS message may be broken down into character blocks in a predetermined manner, and the hash functions may be performed on each distinct character block that is extracted from each SMS message. In some embodiments, the hash functions may be performed by processing the blocks of characters extracted from the SMS messages through a counting Bloom filter to generate a Bloom filter output array for the group of electronic messages. Next, a signature is generated for the group of SMS messages using the outputs from the hash functions (block 285). In some embodiments, the signature may be the non-zero positions in the Bloom filter output array that are incremented by each of the plurality of messages. This signature may then be used to identify SMS messages that are spam (block 290). In some embodiments, the signature may be generated based solely on portions of the group of SMS messages that are identical.

Figure 12:
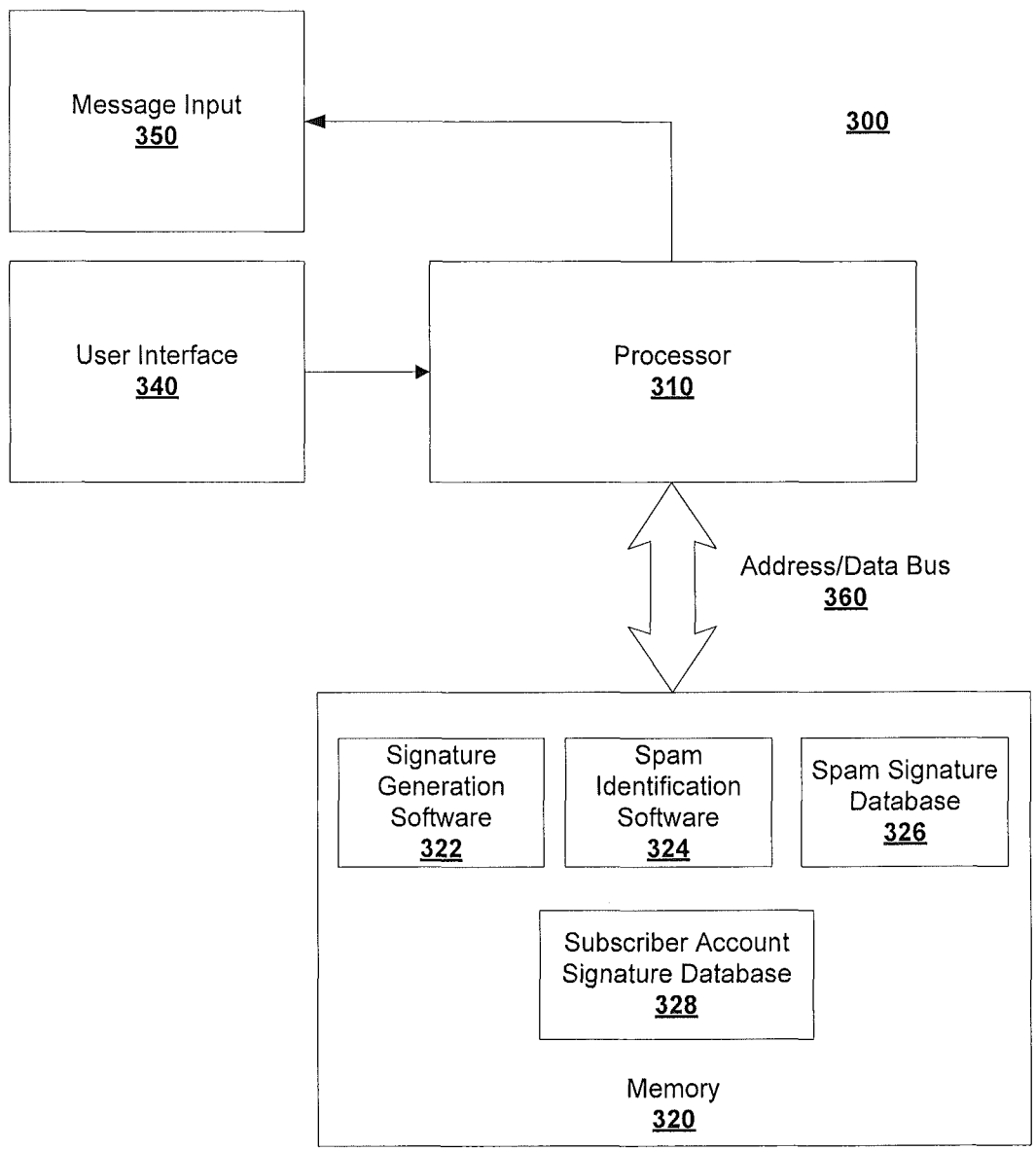
FIG. 12 is a block diagram of a data processing system that is configured to perform the operations of the methods according to some embodiments.

FIG. 12 is a schematic block diagram of a system 300 for mitigating spam. As shown in FIG. 12, the system 300 includes a processor 310, a memory 320, a user interface 340, a message input 350 and a bus 360. The processor 310 can be any appropriate processor, such as processors that are used in commercially available servers. The processor 310 may communicate with the memory 320 via the address/data bus 360. The system 300 receives messages such as, for example, SMS messages that are being transmitted over a communications network via the message input 350. The received messages may be the actual messages or may be copies of the message that are forwarded to the system 300 for analysis.

The memory 320 is representative of the overall hierarchy of memory devices. The memory 320 can include, but is not limited to, the following types of devices: cache, ROM, PROM, EPROM, EEPROM, flash memory, SRAM, and DRAM. The memory 320 may include signature generation software 322, spam identification software 324, a spam signature database 326 and a subscriber account signature database 328. The signature generation software 322 may be a software application that is configured to process received messages using the processor 310 to generate signatures such as spam signatures or account signatures via, for example, the methods discussed above. The signature generation software 322 may, for example, break received messages into n-grams and then cause the processor to perform hash functions on each n-gram to generate a Bloom filter output array for the message or for a group of messages. The spam identification software 324 may be used to compare known spam signatures to a signature for a received message or to a signature for a group of messages. The spam identification software 324 may also be used to compare the signature of a user account to a signature for another user account. The spam signature database 326 may include signatures for known spam messages and/or signatures for groups of spam messages such as, for example, a signature for a group of spam messages that comprise a spam campaign. The subscriber account signature database may include signatures that have been generated for subscriber accounts using the techniques described above.

The signature generation and spam mitigation techniques that are disclosed herein may have a number of advantages. For example, these techniques may be implemented using very efficient data structures such as counting Bloom filters. This may be important given the volume of messages that will be evaluated as part of spam mitigation efforts. The use of such data structures may also scale up more easily for use on, for example, large SMS platforms. It will also be appreciated that the techniques may be used on other similar platforms such as, for example, Multimedia Messaging Service ("MMS"), or even on more dissimilar platforms such as e-mail.

Additionally, since the Bloom filters that are used in some embodiments perform hash functions on the messages traversing the network, the techniques do not store actual messages but instead process the messages to increment Bloom filter output arrays and/or to compare a signature of the message to another signature. Thus, the techniques disclosed herein may not raise the same type of subscriber privacy concerns that may be raised by other spam mitigation approaches.

Moreover, the techniques described herein may work on any type of spam message, regardless of the actual content, and may be effective against spammers who make slight to moderate changes to the messages that are part of the same spam campaign. Additionally, the techniques may be effective not only against commercial spam (e.g., advertisements), but also against malicious spam such as malware that is designed to compromise the transmitting device.

It will be appreciated that numerous variations may be made to the techniques disclosed above without departing from the scope of the present invention. For example, a wide variety of approaches may be used to divide messages into blocks including the above-described n-gram techniques such as, for example, Shingling, Rabin fingerprints, etc. It will also be appreciated that embodiments that use n-grams may define the n-grams in a variety of different ways. For example, in the above embodiments, each n-gram includes n consecutive characters from the message. In other embodiments, consecutive characters need not be used. As another example, in the above embodiment, n-grams are formed starting with each character in the message (i.e., to form the next n-gram, you shift one character to the right). In other embodiments, the n-grams may be formed by shifting two or more characters to the right, such that fewer n-grams will be generated from each message. This approach may reduce the amount of processing required, but may also reduce accuracy.

Various example embodiments have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

All embodiments can be combined in any way and/or combination.

As will be appreciated by one of skill in the art, the example embodiments discussed above may be embodied as a method, data processing system, and/or computer program product. Accordingly, some embodiments may be implemented entirely in hardware, others may be implemented entirely in software, and still others may be implemented in a combination of software and hardware. Some embodiments may take the form of a computer program product on a computer-usable storage medium having computer-usable program code embodied in the medium. Any suitable computer readable medium may be utilized including, for example, hard disks, CD-ROMs, optical storage devices, or magnetic storage devices.

Computer program code for carrying out operations of the above-described methods may be written in an object oriented programming language such as Java®, Smalltalk or C++. However, the computer program code for carrying out these operations may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Some embodiments are described above with reference to flowchart illustrations and/or block diagrams. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A method of identifying a spam message, comprising:
receiving, by a server, textual characters extracted from known spam messages;
generating, by a server, a first Bloom filter output array from hash values representing the textual characters by hashing digital representations of only the textual characters extracted from the known spam messages using hash function;
obtaining, by the server, a second Bloom filter output array generated from a hash value representing a text message, wherein the obtaining comprises extracting textual characters from the text message;
comparing, by the server, the second Bloom filter output array according to the hash value representing the text message to the first Bloom filter output array according to the hash values representing the textual characters to obtain a comparison; and
in response to the comparison indicating a match between the first and second Bloom filter output arrays, identifying, by the server, the text message as the spam message, wherein the comparison indicates the match is based on positions in the first and second Bloom filter output arrays that have non-zero values.

2. The method of claim 1, further comprising processing short message service messages.

3. The method of claim 2, further comprising extracting the textual characters from the short message service messages.

4. The method of claim 2, further comprising extracting the textual characters from at least one of the short message service messages.

5. The method of claim 1, further comprising determining a user account sending the text message identified as the spam message.

6. The method of claim 1, further comprising determining a sender's address associated with the text message identified as the spam message.

7. A system for identifying a spam message, comprising:
a hardware processor; and
a memory device storing instructions that, when executed by the hardware processor, perform operations, the operations comprising:
receiving non-consecutive textual characters extracted from known spam messages;
generating a first Bloom filter output array from hash values representing the non-consecutive textual characters extracted from the known spam messages by hashing digital representations of the non-consecutive textual characters according to a hash function, wherein the generating comprises generating the first Bloom filter output array using only non-consecutive textual characters common to all spam messages of the known spam messages;
comparing a second Bloom filter output array according to a hash value representing a text message to the first Bloom filter output array according to the hash values representing the non-consecutive textual characters extracted from the known spam messages to obtain a comparison, wherein the comparing comprises comparing respective positions of the second Bloom filter output array with respective positions of the first Bloom filter output array; and
in response to the comparison indicating a match between the first and second Bloom filter output arrays, identifying the text message as the spam message.

8. The system of claim 7, wherein the operations further comprise extracting the textual characters.

9. The system of claim 7, wherein the operations further comprise processing short message service messages.

10. The system of claim 9, wherein the operations further comprise extracting the textual characters from the short message service messages.

11. The system of claim 9, wherein the operations further comprise extracting the textual characters from at least one of the short message service messages.

12. The system of claim 7, wherein the operations further comprise determining a user account sending the text message identified as the spam message.

13. The system of claim 7, wherein the operations further comprise determining a sender's address associated with the text message identified as the spam message.

14. A non-transitory memory device storing instructions that when executed cause a hardware processor to perform operations, the operations comprising:
   receiving non-consecutive textual characters extracted from known spam messages;
   generating a first Bloom filter output array from hash values representing the non-consecutive textual characters extracted from the known spam messages by hashing digital representations of the non-consecutive textual characters, wherein the generating comprises generating the first Bloom filter output array using only non-consecutive textual characters common to all spam messages of the known spam messages;
   comparing a second Bloom filter output array according to a hash value representing a text message to the first Bloom filter output array according to the hash values representing the non-consecutive textual characters extracted from the known spam messages to obtain a comparison, wherein the comparing comprises comparing respective positions of the second Bloom filter output array with respective positions of the first Bloom filter output array; and
   in response to the comparison indicating a match between the first and second Bloom filter output arrays, identifying the text message as a spam message.

15. The non-transitory memory device of claim 14, wherein the operations further comprise extracting the textual characters.

16. The non-transitory memory device of claim 14, wherein the operations further comprise processing short message service messages.

17. The non-transitory memory device of claim 16, wherein the operations further comprise extracting the textual characters from the short message service messages.

18. The non-transitory memory device of claim 16, wherein the operations further comprise extracting the textual characters from at least one of the short message service messages.

19. The non-transitory memory device of claim 14, wherein the operations further comprise determining a user account sending the text message identified as the spam message.

20. The method of claim 1, further comprising identifying, based on the first Bloom filter output array, a user account sending the text message identified as the spam message.

* * * * *